Sept. 1, 1970     R. L. ARCHER     3,526,141
VELOCITY-SENSING APPARATUS

Filed May 31, 1966     2 Sheets-Sheet 1

3,526,141
VELOCITY-SENSING APPARATUS
Robert L. Archer, Woodbury, N.Y., assignor to Fairchild Camera and Instrument Corporation, a corporation of Delaware
Filed May 31, 1966, Ser. No. 553,793
Int. Cl. G01p 7/00
U.S. Cl. 73—503                                    2 Claims

ABSTRACT OF THE DISCLOSURE

An apparatus for sensing the attainment of a predetermined increase in velocity by an accelerating body comprises a housing adapted to be mounted on the body and including an elongated chamber essentially parallel to the direction of acceleration and filled with a viscous fluid. A spherical steel ball is disposed in the chamber and is movable axially in the chamber and restrained from axial movement substantially solely by viscous fluid drag. The chamber includes three or more longitudinal radially inwardly extending fins with inner knife edges forming a substantially antifriction guide for the steel ball while restraining it from transverse movement in the chamber but providing substantially unrestricted axial circulation of the contained fluid. The apparatus further includes a permanent magnet movable between restraining and nonrestraining positions on the steel ball, such magnet being releasably latched in restraining position and biased to nonrestraining position. The magnet is disposed to restrain the ball at the leading end of the chamber and there is provided means at the other end of the chamber for sensing the arrival of the ball after release by the magnet, the arrival of the ball at the sensing means being an indication of a predetermined increase in the velocity.

---

This invention relates to velocity-sensing apparatus and particularly to such apparatus for sensing the attainment of a predetermined increase in velocity by an accelerating body.

Heretofore, devices for sensing the velocity of a moving body have generally responded either directly to the relative velocity of the body with respect to a surrounding medium, for example, pitot tubes, anemometers, etc., measuring the relative air velocity, or indirectly by means responsive to the change in position of the body with respect to some fixed object, such as the earth, and computing therefrom the velocity of the body relative to such object.

The former of the two methods is subject to a number of disadvantages, for example, nonlinearity in the response, a limited range of velocity measurements, and the requirement of corrections for cavitation and angle of attack. The indirect method, based on a measurement in change of position, requires elaborate sensors as well as relatively complex and costly computers.

It is an object of the present invention, therefore, to provide a new and improved velocity-sensing apparatus which obviates one or more of the foregoing limitations and disadvantages of prior velocity-sensing apparatus.

It is another object of the invention to provide a new and improved velocity-sensing apparatus characterized by one or more of the following advantageous characteristics: absence of contact between the sensing element and the medium surrounding the body on which it is carried; a simple, rugged and inexpensive construction; a substantially linear response; and a response over an extremely wide range of velocities.

The velocity-sensing apparatus of the invention relies for operation upon the time integration of acceleration to measure absolute velocity change. If the body starts from rest at the time that operation of the apparatus is initiated, the apparatus will indicate the final velocity of the body; if the apparatus is put into operation when the body has some initial velocity, the apparatus will indicate the increase in velocity from its initial value. The velocity-sensing apparatus of the invention has many applications, for example for indicating when an aircraft has reached a proper velocity for takeoff.

In accordance with the invention, there is provided an apparatus for sensing the attainment of a predetermined increase in velocity by an accelerating body comprising a housing adapted to be mounted on the body and including an elongated chamber essentially parallel to the direction of acceleration and filled with a viscous fluid, the chamber providing substantially unrestricted axial circulation of the contained fluid, a spherical mass disposed in the housing chamber, movable axially in the chamber and restrained from axial movement substantially solely by viscous fluid drag, the elongated chamber including three or more longitudinal radially inwardly extending fins forming a substantially antifriction guide for the spherical mass, means for releasably restraining the mass at the leading end of the chamber in the direction of acceleration, and means for sensing the arrival of the mass at the other end of the chamber after release by the restraining means, the arrival of the mass at the sensing means being an indication of such predetermined increase in velocity.

For a better understanding of the present invention, together with other and further objects thereof, reference is had to the following description, taken in connection with the accompanying drawings, while its scope will be pointed out in the appended claims.

Referring now to the drawings:

FIG. 2b is a detail viewof the restraining mechanism of the apparatus of FIG. 2, while

Figure 1:
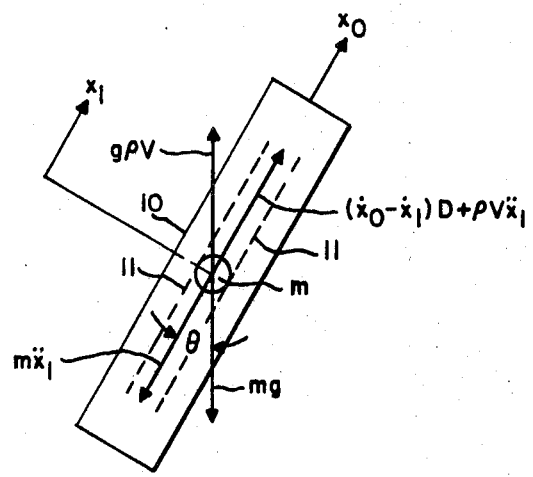
FIG. 1 is a diagram to aid in explanation of the invention.

Before describing the actual velocity-sensing apparatus embodying the invention, it may be helpful to set forth certain underlying principles. Referring to FIG. 1, there is represented a spherical mass $m$ disposed in an elongated chamber 10 filled with a fluid of substantial viscosity, its axis being inclined to the vertical by an angle $\theta$. The motion of the mass $m$ is confined to the axial direction $x_1$ by guides shown schematically at 11 and it is assumed that the friction between the mass and the guides 11 may be neglected. The four components of force acting on the mass $m$, together with the directions of action, are indicated in the drawing, in which:

$x_0$ = coordinate of chamber 10 in the direction of movement
$x_1$ = coordinate of mass $m$ in the same direction
$V$ = volume of mass $m$
$mg$ = force of gravity on mass $m$
$g\rho V$ = force of buoyancy
$\rho$ = density of the viscous fluid
$m\ddot{x}_1$ = acceleration force on mass $m$
$D$ = drag on mass $m$ due to movement through the viscous fluid
$\rho V \ddot{x}_1$ = acceleration force of the volume of liquid displaced by mass $m$.

Using D'Alembert's principle, the differential equation of motion of mass $m$ is:

$$m\ddot{x}_1 + mg \cos \theta = \rho V \cos \theta \cdot g + \rho V \ddot{x}_1 + D(\dot{x}_0 - \dot{x}_1) \quad (1)$$

It can be assumed that the acceleration of the chamber 10 is a smooth, monotonic and continuous function (which is usually the case for aircraft and the like) of the form:

$$\ddot{x}_0 = a + bt + ct^2 + \ldots \quad (2)$$

where $a$, $b$, and $c$ are values peculiar to the exact acceleration profile.

It is possible for $\ddot{x}_0$ to have higher order terms but, for this analysis, the expression in $a$ and $b$ is sufficient. The analysis below is general and may be extended for higher order polynomials in $t$ which describe $\ddot{x}_0$. For the linear profile in $t$, the exact solution of Equations 1 and 2 is:

$$x_1 = \frac{\gamma}{\tau}[\epsilon^{-\tau t} - 1] + \gamma t + \frac{\beta}{2}t^2 + \frac{\alpha}{3}t^3 + \ldots \quad (3)$$

where $\alpha$, $\beta$, and $\gamma$ are constants determined by the viscosity of the fluid in the chamber 10, the volume V, the mass of $m$, the values of $a$ and $b$, and $\tau$, the ratio $D/m - \rho V$ The displacement $x_0$ of chamber 10, due to the constant acceleration $\ddot{x}_0$ is:

$$x_0 = \int\int [\ddot{x}_1 dt] dt = \frac{at^2}{2!} + \frac{bt^3}{3!} + \frac{ct^4}{4!} + \ldots \quad (4)$$

where $a$, $b$, and $c$, as given before, are related to the profile of the acceleration of chamber 10.

The resultant travel $\Delta x$ of the mass $m$ relative to the chamber 10 is then:

$$\Delta x = x_0 - x_1 \quad (5)$$

If we let $-g \cos \theta = K$, then substituting Equations 3 and 4 in Equation 5 gives the relation:

$$\Delta x = \frac{b}{2\tau}t^2 + \left(\frac{K-a}{\tau} + \frac{b}{\tau 2}\right)\left[\frac{1}{\tau}(1 - \epsilon^{-\tau t}) - t\right] \quad (6)$$

where the higher order terms in $t$ related to the higher order constants in the profile of $\ddot{x}_1$ have been neglected.

For most purposes, the period during which the change in velocity is to be measured is much larger than $1/\tau$. Also, since $\tau$ is generally very large, Equation 6 may be reduced to:

$$\Delta x = \frac{1}{\tau}\left[\frac{b}{2}t^2 + at\right] + \frac{K}{\tau}t \quad (7)$$

By compensating out the effect of the gravity factor $$\frac{K}{\tau} \cdot t$$

Equation 7 is equivalent to the expression:

$$\Delta x = \frac{1}{\tau}\int_0^t \ddot{x}_0 dt = \frac{1}{\tau}\dot{x}_0 \quad (8)$$

Thus, the relative displacement between the mass $m$ and the chamber 10 is an exact integration of the acceleration $\ddot{x}_0$ of the body and, thus, of the chamber 10.

Figure 2:
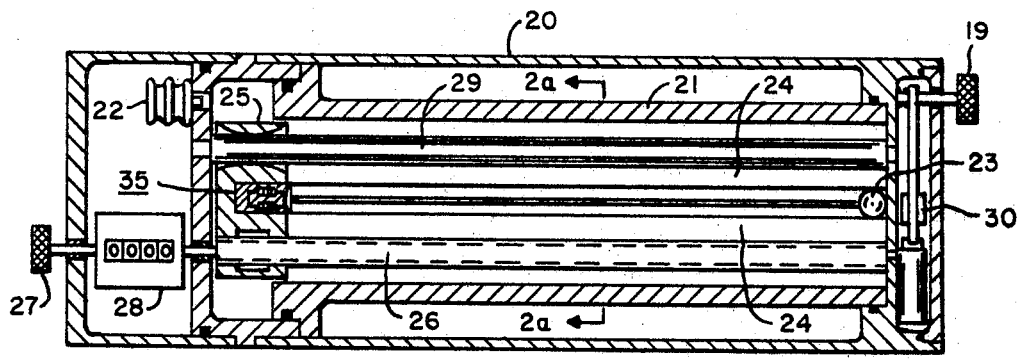
FIG. 2 is a longitudinal view, partly in section, of a velocity-sensing apparatus embodying the invention.

Referring now more particularly to FIG. 2 of the drawings, there is represented an apparatus embodying the invention for sensing the attainment of a predetermined increase in velocity by an accelerating body and comprising a housing 20 adapted to be mounted on the body and including an elongated cylindrical chamber 21 essentially parallel to the direction of acceleration of the body and filled with a viscous fluid, for example a silicone oil of Type DC-200 commercially available from Dow-Corning, which has a low temperature sensitivity, high degree of stability, and an easily regulated viscosity. To provide for thermal expansion and contraction of the fluid in the chamber 21, there is provided an expansible bellows 22 having a fluid connection with the chamber. Disposed in the chamber 21 is an isogeometric mass of paramagnetic material such as a spherical iron ball 23. Such a shape has a substantially linear velocity-drag force characteristic due to motion through such a viscous fluid, irrespective of the attitude of the chamber 21 in relation to the direction of acceleration.

Figure 2A:
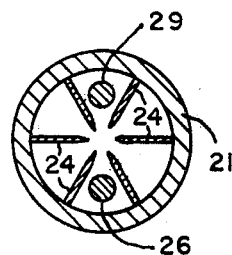
FIG. 2a is a cross-sectional detail of a portion of the apparatus of FIG. 2.

The sensing apparatus of FIG. 2 further comprises a plurality of longitudinal radially extending fins 24, seen more clearly in FIG. 2a. These fins have inner knife edges and are disposed in the chamber 21 and form a substantially antifriction guide for movement of the ball 23 longitudinally of the chamber 21. There is further provided an axially adjustable member disposed in the chamber 21, specifically a block 25, closely fitting the inner walls of the chamber 21 and slidable longitudinally thereof. The member 25 is provided with a calibrating adjusting means which may be in the form of a lead screw 26 having a threading engagement with the member 25 and rotatable via an adjusting knob 27 which also actuates a counter 28 viewable through a window (not shown) in housing 20 and indicating the rotational position of the lead screw 26. The counter 28 and the lead screw 26 may be suitably calibrated so that each digit of the counter 28 represents a longitudinal advance of the member 25 a finite distance, for example 0.01 inch. The apparatus of FIG. 2 further comprises a longitudinal guide 29 in the form of a cylindrical tubing secured at either end in the walls of the housing 20 and providing a closely fitting sliding engagement with the member 25, thereby preventing its rotation in the chamber 21 upon operation of the lead screw 26 for axial adjustment of the member 25.

Figure 2B:
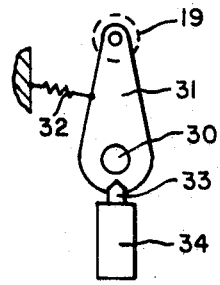

The sensing apparatus of the invention further comprises means for releasably restraining the mass or ball 23 at the leading end of the chamber 21 in the direction of acceleration. This latter means is preferably in the form of a small permanent magnet 30 releasably latched in a restraining position registering with the position of the ball 23 in its extreme right-hand position, as shown in FIG. 2, and acting through the thin end wall of the housing 20. As shown more clearly in FIG. 2b, the permanent magnet 30 is biased to a nonrestraining position as by mounting it on a pivoted arm 31 having an actuating knob 19 and biased by a spring 32 away from the position shown in FIGS. 2 and 2b. The pivoted arm 31 is releasably latched in the position shown by a detent member 33 engaging a notch in the arm 31. The detent 33 is actuated by a solenoid 34, as described hereinafter.

The sensing apparatus of the invention further comprises means disposed on the member 25 for sensing the arrival of the mass or ball 23 at the other end of the chamber after release by the restraining latch just described. This latter means may be in the form of an electromagnetic reluctance type pickup 35 which includes a magnetic core element 36 (FIG. 3) having a substantial air gap, the mass or ball 23 substantially bridging the air gap upon arrival at the sensing means. The housing 20, chamber 21, and guide fins 24 are fabricated of nonmagnetic material, such as aluminum.

Figure 3:
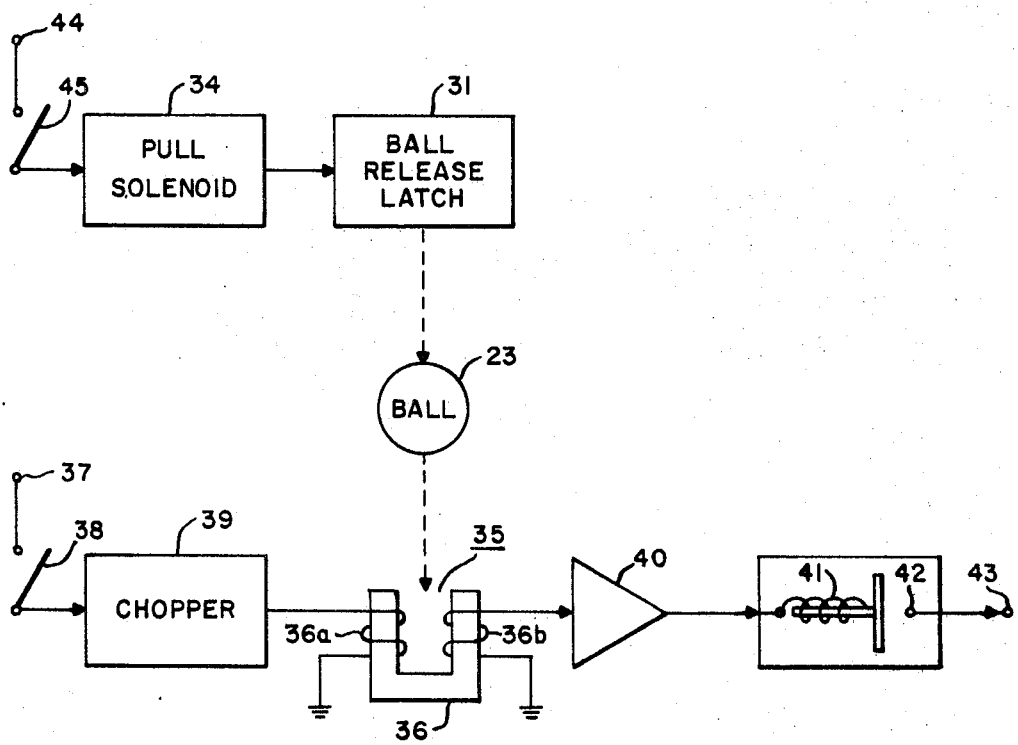
FIG. 3 is a schematic circuit diagram illustrating an application of one form of the velocity-sensing apparatus of the invention.

In FIG. 3 is a schematic representation of one application of the sensing apparatus of the invention, corresponding elements being identified by the same reference numerals. In this instance, a suitable unidirectional potential is applied at an input terminal 37 via a switch 38 to a chopper or interrupter unit 39, or equivalent, to develop a periodic pulse or alternating current. This current is applied to a primary winding 36a of the sensor 35 while the secondary winding 36b of this unit is connected via an amplifier 40 to a relay 41 which, when energized, closes its contacts 42 to supply a signal to an output terminal 43. The solenoid 34 can be energized from an input terminal 44 via a switch 45.

In explaining the operation of the sensing apparatus described, it may be assumed that it is to be used to sense when a plane has reached appropriate velocity for takeoff. It will also be assumed that initially the ball or mass 23 is retained at the leading edge of the chamber in the direction of acceleration by the permanent magnet latch 30, 31. The knob 27 is adjusted to advance the member 25 in the chamber 21 to such a position that the counter 28 reads the increase in velocity which the apparatus is to sense. When it is desired to initiate operation of the apparatus to sense increase in velocity, for example as the plane begins its travel down the air strip, the switches 38 and 45 are closed. As a result, the solenoid 34 is energized to unlatch the arm 31 and to withdraw the magnet 30 from its restraining position. The ball or mass 23, under the influence of the acceleration of the plane, then commences its travel down the chamber 21 in the path defined by the guide vanes 24. These knife-edge vanes introduce a minimum friction in the passage of the ball 23 through chamber 21 so that the retarding force on the ball is solely that due to the drag of the viscous liquid. When the ball 23 reaches the sensor 35, the signal induced in the secondary winding 36b increases sharply and this signal is translated by the amplifier 40 to energize the relay 41 to close its contact 42 and thereby deliver a signal to the output terminal 43 indicating that the desired velocity has been reached. Although the sensor 35 has a tendency to attract the ball 23 when it comes close, the effect is a constant one which can be compensated by adjusting the zero position of the member 25 relative to the counter 28. Obviously, this signal may be utilized to give any desired audible or visual alarm or to initiate any desired control action.

Once the sensing apparatus has completed a cycle of operation as described, the member 25 is adjusted by the knob 27 to return the ball or mass 23 to its extreme righthand position, as shown in FIG. 2, and the knob 19 is actuated to return the pivotal arm 31 to its latched position, thus again restraining the ball. The member 25 is then returned by rotation of the knob 27 to its starting point or to any intermediate point representing a velocity increase which it may be desired to sense during the next cycle of operation of the apparatus.

From the foregoing description, it is clear that the sensing apparatus of the invention has a number of distinct advantages over prior devices for obtaining a similar measurement:

(1) The design is extremely simple mechanically, permitting low-cost, high-volume production.

(2) Because of the simplicity of the mechanism, a minimum of intstrumentation is required for sensing purposes.

(3) The apparatus has a long shelf life since all critical components are mechanical and no power sources such as batteries and the like are required to be carried in the apparatus itself.

(4) The setting of the apparatus to sense any desired velocity increase is facilitated by the calibrated adjusting screw and digital read-out counter.

(5) The apparatus is characterized by extremely high accuracy since frictional effects and external interactions are reduced to a minimum. Any effects of temperature variations may be calibrated out during the setting procedure.

(6) Since the increase in velocity is measured by integration of acceleration and provides a total summation process, high-frequency and noise components, for example those due to vibration, are filtered out.

(7) By providing a minimum of friction between the ball or mass 23 and its associated guides, the drag on the ball is solely that due to the viscid fluid through which it is moving, thereby improving the accuracy of the apparatus. Since the ball can roll along the knife-edge contacts of the vanes, frictional cross-coupling due to spin or to a partial loading by gravity is virtually eliminated.

While there has been described what is, at present, considered to be the preferred embodiment of the invention, it will be obvious to those skilled in the art that various changes and modifications may be made therein, without departing from the invention, and it is, therefore, aimed in the appended claims to cover all such changes and modifications as fall within the true spirit and scope of the invention.

What is claimed is:

1. An apparatus for sensing the attainment of a predetermined increase in velocity by an accelerating body comprising:

a housing adapted to be mounted on the body and including an elongated chamber essentially parallel to the direction of acceleration and filled with a viscous fluid, said chamber providing substantially unrestricted axial circulation of the contained fluid;

a spherical mass disposed in said chamber, movable axially in said chamber and restrained from axial movement substantially solely by viscous fluid drag;

said chamber including three or more longitudinal radially inwardly extending fins forming a substantially antifriction guide for said mass;

means for releasably restraining said mass at the leading end of said chamber in the direction of acceleration;

and means for sensing the arrival of said mass at the other end of said chamber after release by said last-named means, the arrival of said mass at said sensing means being an indicaiton of said predetermined increase in velocity.

2. A velocity-sensing apparatus in accordance with claim 1 in which said fins have inner knife edges.

References Cited

UNITED STATES PATENTS

| 2,603,726 | 7/1952 | McLean | 73—503 XR |
| 2,733,116 | 1/1956 | Fantham et al. | 73—517 XR |
| 2,933,300 | 4/1960 | McCollum | 73—517 XR |
| 2,993,382 | 7/1961 | Orrange | 73—503 XR |
| 3,008,334 | 11/1961 | Lees | 73—503 |
| 3,126,739 | 3/1964 | Whitehill | 73—515 XR |
| 3,239,620 | 3/1966 | Albert | 200—61.45 |
| 3,114,267 | 12/1963 | Mundo | 73—490 |

JAMES J. GILL, Primary Examiner

U.S. Cl. X.R.

73—516